United States Patent [19]

Sodini

[11] 4,451,763
[45] May 29, 1984

[54] ELECTRONIC LAMP CONTROL APPARATUS

[75] Inventor: Gregory L. Sodini, Memphis, Tenn.

[73] Assignee: International Telephone and Telegraph Corporation, New York, N.Y.

[21] Appl. No.: 374,983

[22] Filed: May 5, 1982

[51] Int. Cl.³ .............................................. H05B 37/02
[52] U.S. Cl. .................................... 315/159; 307/141; 315/360
[58] Field of Search ............... 315/159, 360, 307, 362; 250/214 AL, 239; 307/141, 117

[56] References Cited

U.S. PATENT DOCUMENTS

| | | | |
|---|---|---|---|
| 2,295,894 | 9/1942 | Dewan | 315/360 X |
| 4,008,415 | 2/1977 | De Aliva-Serafin et al. | 315/159 X |
| 4,209,728 | 6/1980 | Membreno | 315/159 |
| 4,292,570 | 9/1981 | Engel | 315/159 X |

Primary Examiner—Eugene R. Laroche
Attorney, Agent, or Firm—James B. Raden; Marvin M. Chaban

[57] ABSTRACT

A control for an outdoor lighting fixture which adds an extra off-on cycle to that imposed by a photoelectric cell control. At a predetermined time during the on period of the lighting fixture, the lamp of the fixture is shut off. This shut-off time had previously been determined as one during which traffic in the area is at a minimum. A set time after the shut off, the lamp is lit once again, this time being selected as a time when traffic is re-appearing. When the ambient light reaches the shut-off level of the photoelectric cell, the lamp is shut off for the day. In this way, the lamp is turned off for a timed period for the purpose of reducing the energy required by the lamp for the dark hours of the night.

2 Claims, 4 Drawing Figures

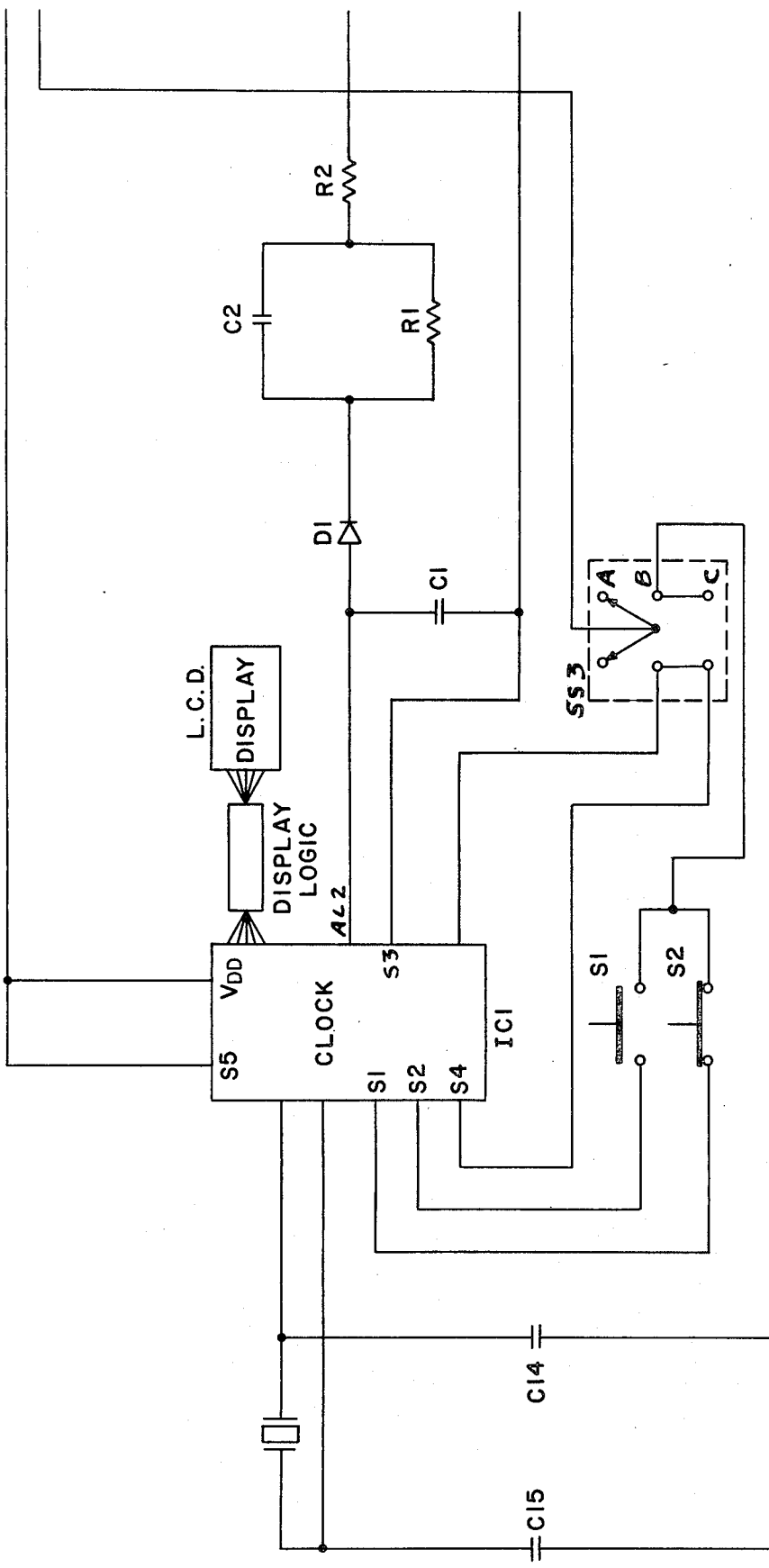
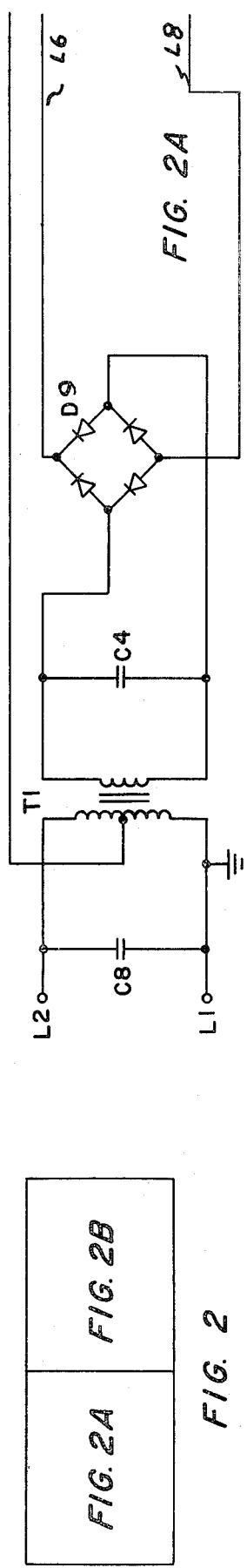
FIG. 2A
FIG. 2
| FIG. 2A |
| FIG. 2B |

ELECTRONIC LAMP CONTROL APPARATUS

BACKGROUND OF THE INVENTION

Photoelectric cell control of outdoor lighting fixtures is, of course, wellknown, and is in use for much of the urban street lighting programs of the U.S. With such systems, the fixture is turned on at dusk or when the ambient light darkens to a predetermined light level. The fixture remains on until day break when the ambient light reaches a level bright enough to cause the photocell to turn the light off. The light remains off during the daylight hours.

In the current energy saving mood, the question is asked as to why the fixture should remain on during the early hours of the morning when traffic is traditionally light and there is little need for the light, clearly not the same need as the early evening hours.

From this line of reasoning, the present invention has been evolved.

SUMMARY OF THE INVENTION

The present invention provides a time clock control superimposed on a photocell control of an outdoor lighting fixture to turn off the fixture for a number of hours of the post midnight period. In this way, the energy consumption of the fixture for the normal lighting period, i.e. night, is reduced. The period during which the fixture is shut off is that of minimum traffic and hence lessened need for light. As determined by the user, all or a proportion of the light fixtures may be equipped with the present invention to maintain some light in the area but less than that required for the peak evening traffic hours. For example, every other fixture may be so equipped to maintain a lighting level during the night for security purposes.

To accomplish this result, the present device provides a time clock control superimposed on a light fixture equipped with the conventional photocell control. The device obtains its basic operating power from the lighting power source and is protected against surges and other transients. The control clock is independently powered to provide more stable clock control.

An integrated circuit chip is used as a master clock for initiating the timed control. A manual switch allows the time to be set in conjunction with a visual display to enable viewing of the time being set. The clock initiates a pulse signal when the set time arrives to turn off the fixture lamp. The pulse signal also initiates a second timing circuit for turning on the lamp at the end of a predetermined time period after the initiating pulse signal. If however, the ambient light at the end of the time period is brighter than the photocell turn off setting, the lamp will remain off. Once shut off by the photocell, the lamp remains off until the ambient light causes the photocell once again to lower its resistance to the lamp operating level.

BRIEF DESCRIPTION OF THE DRAWINGS

FIG. 2 shows the relationship of FIGS. 2A and 2B;

FIGS. 2A and 2B show a schematic circuit diagram of the electronic control circuit of FIG. 1.

DETAILED DESCRIPTION

Figure 1:
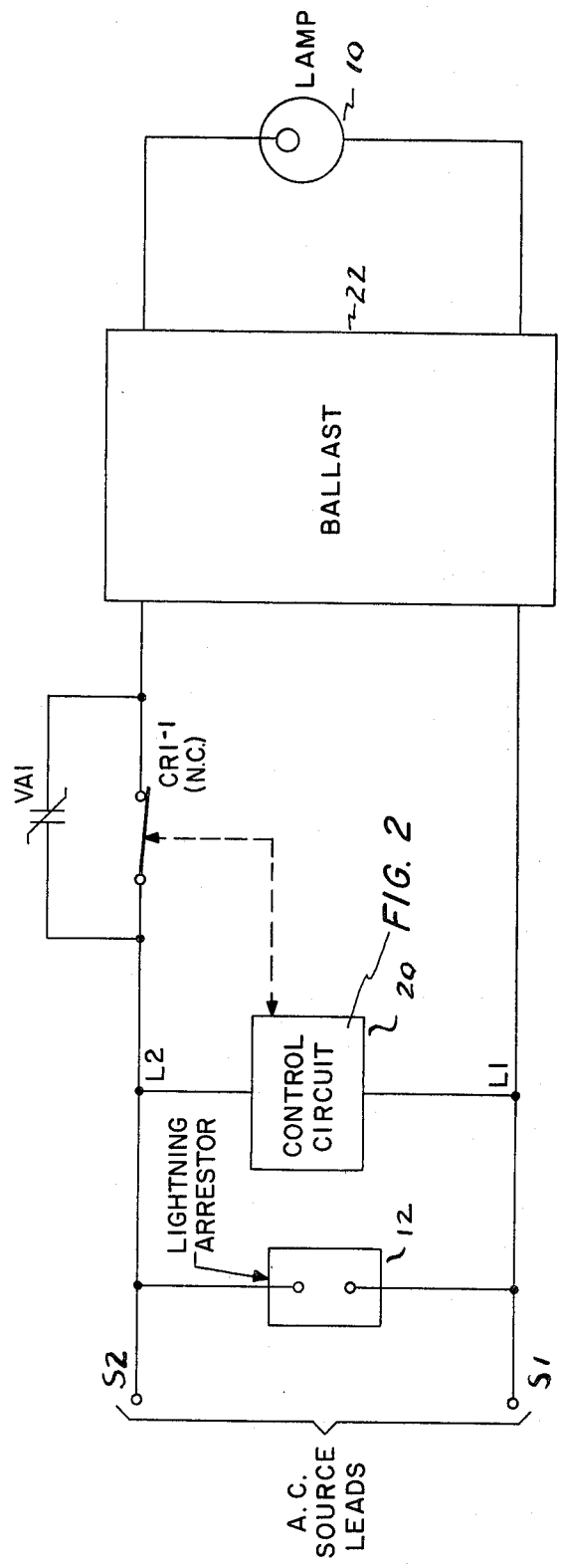
FIG. 1 is a block diagram of the electrical circuit for an outdoor lighting fixture.

In FIG. 1, is shown a pair of source terminals S 1 and S 2 which are connected to a suitable power supply as the source of 60 cycle AC, 110 to 480 volts which provide power for the lamp 10 over conductors over wires L 1 and L 2. As is conventional, lighting arrestors 12 are connected across the line. The electronics circuit 20 (of FIG. 2) is also connected across the line. One wire L 2 has a normally closed set of relay operated contacts CR 1—1 in series for breaking a path when the contacts are opened on operation of the relay CR 1. The contact path is directed to the ballast 22, the contacts on breaking open the path shut off the supply of current and operating power for the lamp 10. When enough ambient light is hitting the photo cell (PC) it approximates a short circuit condition through the cell and energizes relay CR 1. Energization of relay CR 1 opens contact CR 1—1 during the day and keep the fixture off. At night without much ambient light the cell PC appears to be an open circuit and relay coil CR1 is deenergized closing contacts CR1—1, and lighting the fixture.

The set of contacts CR 1—1 are contacts of the relay CR-1 (of FIG. 2) and these contacts have a transient surge protector VA1 across the contacts to provide spark suppression.

Figure 2B:
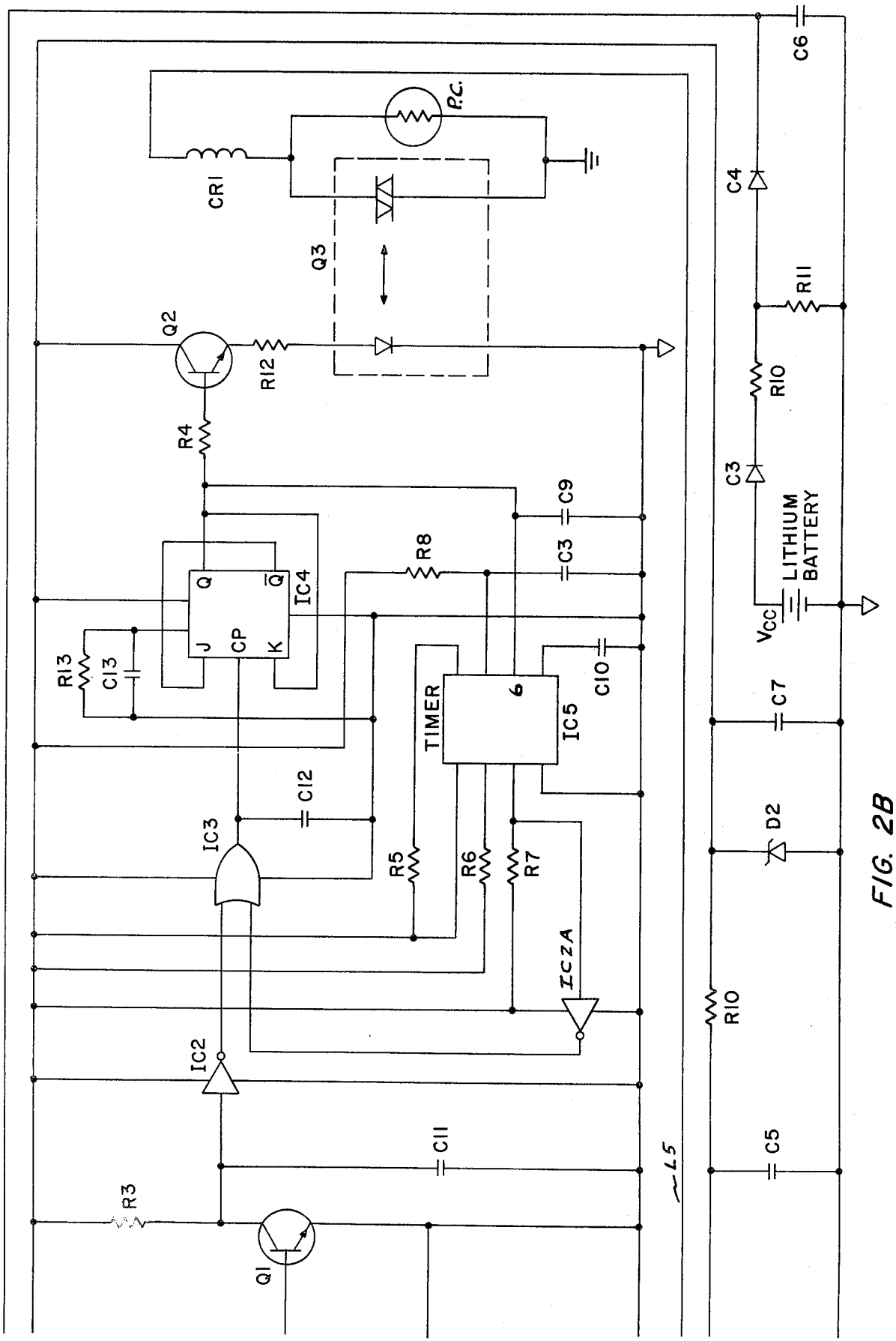

In the electronics package 20 of FIG. 2, the leads L1 and L2 are connected to the primary of a transformer T1. The transformer primary is grounded. The primary is center tapped over a lead L5 to one end of the winding of relay CR-1. The other side of the relay winding is connected to a parallel switching combination, the other side of the parallel combination being grounded to complete a switched A.C. path. The parallel combination includes a photoelectric cell (PC) of conventional type used for outdoor lighting fixtures. In parallel with the photocell is the output of an optically isolated triac Q3.

The secondary of transformer T1 is connected to a bridge rectifier D9 to convert the current output to direct current for powering the electronics package over leads L6 and L8.

The electronics circuit has an oscillator O1 which preferably is a 4.194304 MHZ crystal oscillator which produces input pulses for the CMOS master clock IC1 which may be a suitable microprocessor chip. The clock keeps track of the real time of day having a settable memory for producing an output pulse at a set time. The clock port AL2 provides a pulse output to an LCD digital clock display which is visible to service personnel maintaining the device. The time which is displayed on the LCD display depends on the piston of the control or setting switch SS3, as will be explained. The clock chip is powered by a battery isolated from the power supply to operate the battery independently of line surges.

Switch SS3 is a three position toggle switch. The first or A position of the switch SS3, as shown, is the run position or normal circuit operating position. The switch is set to the A position to allow the electronics circuit of FIG. 2 to operate. With the switch in the B position, a path from power lead L6 is closed to input terminal S3 of the clock IC1, and through the contacts of momentary time set switches SS1 and SS2 to inputs terminals S1 and S2. In this position, the time of day may be set by manipulation of switches SS1 for hours and SS2 for minutes, the setting being similar to that of the setting of a digital alarm clock. In the C posistion of switch SS3, terminal inputs S4 and S1 and S2 of clock IC1 are connected to the power lead L6 to set the turn off time. With switch SS3 in the B position, the LCD display shows the real time of day and in position C, the time at which the output pulse is generated by the time clock.

The output of clock IC1 on lead AL2 is coupled to the base of transister Q1 through the transient surge protection network including the diode D1 and capacitor C1 and the RC network of capacitor C2 and resistor R1. Transistor Q1, an NPN transistor is connected in common emitter configuration. In combination with resistors R2 and R3, transistor Q1 forms a voltage amplifier. The output collector of transistor Q1 is directly coupled to inverter IC2A (TTL inverter logic) to provide one input to OR gate IC3. The output of the TTL OR gate IC3 is connected to the clock input (CP) of flip flop IC4. IC4 is a master-slave negative edge triggered flip flop. The Q output of flip flop IC4 is connected to the base of transistor Q2. The Q output of the flip flop IC4 is also connected to port 6 of the timer IC5. The timer IC5 is a monolithic N bit counter, oscillator and flip flop that provides a second input through inverter IC2A to the OR gate IC3, as will be explained. Transistor Q2 is connected in common collector configuration with its emitter connected to the gate of triac Q3, the anode and cathode of the triac being across the power source in series with the input of the triac. The output section of the triac is in parallel with the photocell PC and in series with the winding CR1 of the operating relay.

Within the circuit, the electrical components may be described as follows:

Resistors R6, R7, and R5 are pullup resistors for the open collector outputs of IC5.

Capacitors C10, C11, C12, C9, C8, C7, and C6 are transient suppression capacitors to keep transient signals from falsely triggering either IC4, IC5, or IC1, respectively.

Transformer T1 is a 240 volt to 24 volt step down transformer which is used as the first step in generating 5.1 volts d.c. for power supply to the low power Schottky TTL integrated circuits, transistors Q1 and Q2, and optically isolated triac Q3.

Diode D2 is a zener diode which is used to regulate the 5 volts to the TTL logic when the AC line voltage varies from its nominal.

Resistor R10 is sized small enough so as to keep the Zener Diode D2 operating in its zener range when load requirements are high, and to limit the current through the zener diode during periods of litle or no load.

Vcc is a Lithium battery used to supply power to the CMOS integrated circuit IC1 during regular periods and during power shutdown periods. By the use of the alternate power supply to the clock, a power outage will not cause the destruction of the data stored in the clock IC1. The battery circuit is completed through a floating ground to the clock chip IC1. Resistors R11 and R12 are used as a voltage divider network to step the battery voltage down to the required level for the CMOS circuit.

The operation of the circuit may be described as follows:

The output of clock IC1 is a constant level d.c., once the output on lead AL2 is triggered. Since a pulse must be generated to clock flip-flop IC4, the parallel combination of capacitor C2 and resistor R1 is used. At a time equal to the time set on clock IC1, called t(off) the output of IC1 goes high. The time t(off) is the time to which IC1 has been programmed to produce its output pulse on lead AL2 in order to turn the fixture off. Since capacitor C2 does not have an initial charge, theRC combination looks like a short circuit and the output of the C2/R1 combination goes to 1.5 volts (the high state output of IC1). As capacitor C2 charges up it begins to look like an open circuit, and the output voltage of the C2/R1 combination goes to zero. Resistor R1 is sized very high to limit the voltage on the output due to its presence in the circuit. Its purpose in the circuit is to allow capacitor C2 sufficient time to charge and to discharge. Capacitor C2 must be sized large enough to produce sufficient pulse width to trigger TTL logic after integrated circuit IC1 has reset at the end of its pulse period.

The amplifier comprised of transistor Q1, and resistors R2 and R3 is needed to boost the 1.5 volt CMOS Logic level to at least 2 volts to insure switching of the TTL logic (actual amplification of about 4.8 volts is produced). The resistors R2 and R3 along with the parameters of transistor Q1 are sized so as to insure proper voltage gain.

Since transistor Q1 is connected in a common emitter configuration, the output is 180° out of phase with the input. With logic circuitry, this specifically means the output is the logical inversion of the input. Integrated circuit IC2 corrects this problem by inverting the output of transistor Q1.

The pulse generated by integrated circuit IC2 is fed into integrated circuit IC4 through integrated circuit OR gate IC3. OR gate IC3 allows the clocking of the flip flop IC4 by either IC2 or IC5, as will be explained.

Flip flop IC4 is initially set with a low logic level on its Q output. Since the $\overline{Q}$ output is fed back into the J input and the Q output is fed back into the K input, successive clocking of the integrated circuit, IC4 will cause its output to go logic high and then logic low.

Once the flip flop is clocked to a logic high via IC2 through OR gate IC3, transistor Q2 is turned on. Transistor Q2 gives proper current gain to insure the turn on of the optically isolated triac Q3. Resistors R4 and R12 are sized so as to allow Q2 to have proper current gain. Once Q3 is turned on, it energizes the relay coil CR1, the relay opens its normally closed contacts CR1—1, turning the fixture off.

At the same time that flip flop IC4 turns transistor Q2 on, it also turns on clock IC5. The frequency of oscillation of the integrated circuit clock IC5 is determined by the R8, C3 combination. The output of integrated circuit IC5 is initially high. Once clocked on by flip flop IC4, the output of IC5 goes to zero. After the passage of the set time interval, the output of clock IC5 goes positive. This positive pulse is the inverted output of what is needed to clock J-K flip flop IC4. The output of clock IC5 is therefore fed into integrated circuit IC-2A, which is an inverter circuit. The inverted output of inverter circuit IC-2A is thus fed into IC4 through OR gate IC3 which clocks the Q output of IC4 to logic low. Transistor Q2, and optically isolated triac Q3, are then turned off. If at this time the photocell has not yet seen enough ambient daylight, the fixture turns back on. If, however, there is enough daylight the photocell PE provides a low resistance path and keeps the relay CR1 energized, thus not allowing the fixture to turn back on. With ambient light enough, the fixture remains off during the daylight hours awaiting the next evenings operation.

By the use of this circuit, the lamp may be shut off for a predetermined duration of its normal on time, thereby reducing the total power needed to operate the lamp during the night hours.

What is claimed is:

1. A control circuit for an outdoor luminaire including a lamp having a photoelectric cell controlled turn off and turn on, a power supply circuit for providing said photoelectric cell and said lamp, first bistable means for illuminating said lamp when the ambient light on said cell is below a predetermined level, a solid state clock powered by said power supply, said clock settable to emit an output pulse at a time set on said clock, a second bistable means, means coupling said second bistable means to said clock to set said second bistable means in response to said output pulse from said clock, a switch responsive to the setting of said second bistable means to switch said first bistable means and shut off said first bistable means, and timing means coupled to said second bistable means to initiate a timing cycle responsive to the setting of said second bistable means, and said timing means operative at the end of a timed cycle to reset said second bistable means and switch said first bistable means.

2. A control circuit as claimed in claim 1, in which said first bistable circuit comprises a relay actuatable either by ambient light on said photoelectric cell in response to the set condition of said bistable circuit.

* * * * *